United States Patent [19]

Gamson et al.

[11] 4,355,017

[45] Oct. 19, 1982

[54] ALUMINUM ELECTROLYTIC CELL CATHODE WASTE RECOVERY

[75] Inventors: Bernard W. Gamson, Potomac, Md.; Howard W. Hayden, Jr., The Dalles, Oreg.

[73] Assignee: Martin Marietta Corporation, Bethesda, Md.

[21] Appl. No.: 263,438

[22] Filed: May 14, 1981

[51] Int. Cl.$^3$ .............................................. C01B 7/19
[52] U.S. Cl. ................................... 423/484; 423/115; 423/116; 423/128; 423/132; 423/483; 423/496; 423/551; 423/555; 423/556; 423/630; 204/67
[58] Field of Search .............. 423/115, 116, 128, 132, 423/483, 484, 495, 630, 496, 551, 555, 556; 204/67

[56] References Cited

U.S. PATENT DOCUMENTS

| | | | |
|---|---|---|---|
| 1,871,723 | 8/1932 | Morrow | 423/116 |
| 2,732,283 | 1/1956 | Clukey | 423/116 |
| 3,073,676 | 1/1963 | Mollard et al. | 423/484 |
| 4,113,832 | 9/1978 | Bell et al. | 423/484 X |
| 4,158,701 | 6/1979 | Anderson et al. | 423/484 X |
| 4,160,808 | 7/1979 | Anderson et al. | 423/484 X |
| 4,160,809 | 7/1976 | Anderson et al. | 423/484 X |

FOREIGN PATENT DOCUMENTS

| | | |
|---|---|---|
| 2056422 | 3/1981 | United Kingdom . |
| 2056425 | 3/1981 | United Kingdom . |
| 2059403 | 4/1981 | United Kingdom . |

*Primary Examiner*—Earl C. Thomas
*Attorney, Agent, or Firm*—Herbert W. Mylius; Gay Chin

[57] ABSTRACT

Recovery of fluoride values from carbonaceous waste cathode materials is achieved by reacting the waste materials with oxygen, water, and sulfur dioxide at temperatures between about 600° C. and 1200° C.

14 Claims, No Drawings

ALUMINUM ELECTROLYTIC CELL CATHODE WASTE RECOVERY

BACKGROUND OF THE INVENTION

This invention relates to the recovery of fluoride values from waste cathodes and materials used for the lining of aluminum electrolytic cells. More specifically, this invention relates to an improved method for the recovery of valuable components from reduction cell linings and cathodes.

The cathodes of electrolytic furnaces used in the production of aluminum are lined with carbon block and carbon lining paste compositions which are electrically conductive. During electrolytic operations, the carbon linings and cathodes gradually absorb bath materials, such as cryolite ($Na_3AlF_6$), aluminum fluoride ($AlF_3$), calcium fluoride ($CaF_2$), alumina, and metallic aluminum. This absorption, principally of cryolite, frequently doubles the cathode weight of a cell during operation. When it becomes necessary to remove the spent cathodes and pot linings, a considerable amount of very expensive fluoride materials is involved. At the present time, due to the lack of feasible recovery systems, most of this spent or waste cell lining material is merely stockpiled, presenting environmental concerns relative to the possible leaching of fluoride salts into ground waters. In addition, the value of the fluoride materials involved, if suitably recoverable, is substantial.

Prior art methods for recovering cryolite from spent cathode materials have included extraction by sodium hydroxide, sodium carbonate, or water. U.S. Pat. Nos. 1,871,723 and 2,732,283 teach the treatment of carbon cell lining material with aqueous caustic solutions to yield sodium fluoride and sodium aluminate, which solutions may be processed to precipitate cryolite. U.S. Pat. No. 3,106,448 teaches reaction between fluoride values in spent liner and a water soluble carbonate to produce water soluble sodium fluoride, which may in turn be precipitated with sodium aluminate to form a cryolite. In addition, the extraction and recovery of alumina and fluoride values with dilute ammonia solutions is known.

One of the more recent methods for recovery of fluoride and aluminum values involves the pyrohydrolysis of the carbonaceous material, preferably in a fluidized bed reactor. Pyrohydrolysis involves contacting the spent cathode and/or cell lining with water or steam at high temperatures, whereby the water introduced reacts with the fluoride compounds to form HF. However, it has been found that while the pyrohydrolysis of aluminum fluoride is relatively easy, calcium fluoride and, particularly, sodium fluoride are more difficult to react. U.S. Pat. Nos. 4,113,832, 4,158,701, 4,160,808, and 4,160,809 all relate to pyrohydrolsis techniques for the recovery of fluoride values from spent cell linings. However, these references fail to provide a feasible and economic method, due to exceptionally high temperature and excessive steam requirements. It has been found that temperatures in excess of 1100° C. are required for the recovery of fluoride from cathode waste by pyrohydrolysis. Fluoride recovery is enhanced by increasing temperature, increasing exposure time, and by the use of considerable quantities of steam.

Thus, it may be observed that there is a well defined need for a suitable fluoride recovery technique, whereby more efficient and economical results may be obtained. It is a purpose of the present invention to provide such a method.

It is a further purpose of the present invention to provide a method for the treatment of cathode waste materials which efficiently decomposes the fluorine-containing components therein and provides for their efficient recovery in the form of aluminum trifluoride, and/or cryolite.

SUMMARY OF THE INVENTION

A process is provided for the recovery of fluorine, sodium, and aluminum values from spent or waste materials generated in electrolytic aluminum production facilities. The reaction of the waste cathode material is conducted at a temperature between 800° C. and 1,000° C., utilizing a gaseous mixture of air, steam, and sulfur dioxide. The sulfur dioxide is provided in sufficient quantity to convert essentially all of the metallic fluoride salts present to metallic sulfates. The reaction may be conducted in suitable reactors such as a multiple stage fluidized bed, a multi-level furnace reactor, or a closed, refractory lined, furnace. The HF enriched gas exiting the reactor may be fed to a second reactor to be reacted with various feed materials for the production of fluorine-containing materials. In a preferred embodiment, aluminum trifluoride is produced through reaction of the HF enriched gas with aluminum trihydrate in a fluidized bed reactor. Alternatively, a mixed cryolite/aluminum trifluoride reduction cell bath material is made by chemisorption of the HF on the surface of metallurgical grade alumina, which is then fed to an aluminum reduction cell. Very high conversion rates of fluorine-containing materials are achieved.

DETAILED DESCRIPTION OF THE INVENTION

This invention relates to the recovery of HF in increased yield from aluminum reduction cell cathodes and linings. More particularly, this invention concerns a process wherein the spent cell materials are reacted at elevated temperatures in a suitable vessel with water, air, and sulfur dioxide. The HF product of this reaction is subsequently absorbed or reacted to form a fluoride compound, such as aluminum trifluoride. The solid reaction products of the reaction comprise sulfates which are removed in the form of ash and/or clinker.

The carbonaceous reduction cell linings and cathodes utilized in this invention comprise materials recovered from conventional aluminum reduction cells after extended use. Typical compositions of such material are shown in Table 1.

TABLE I

Chemical Analysis of Ash From Cathode Waste

| | Sample Number | | |
|---|---|---|---|
| | No. 1 Bottom Block | No. 2 Bottom Block | No. 3 Ramming Paste |
| Constituents | | | |
| Carbon | 64.4 | 35.3 | 55.4 |
| Ash % | 35.6 | 64.7 | 44.6 |
| Analysis of Ash % | | | |
| Sodium, as $Na_2O$ | 40.7 | 45.4 | 57.2 |
| Aluminum, as $Al_2O_3$ | 32.93 | 28.94 | 8.52 |
| Calcium, as $CaO$ | 6.23 | 6.54 | 1.40 |
| Silica, as $SiO_2$ | 1.27 | 1.58 | 14.54 |
| Iron, as $Fe_2O_3$ | 1.35 | 1.50 | 0.78 |
| Magnesium, as $MgO$ | 0.80 | 0.55 | 1.20 |
| Titanium, as $TiO_2$ | 0.14 | 0.12 | 0.08 |

TABLE I-continued

| Chemical Analysis of Ash From Cathode Waste | | | |
|---|---|---|---|
| | Sample Number | | |
| | No. 1 Bottom Block | No. 2 Bottom Block | No. 3 Ramming Paste |
| Nickel, as NiO | 0.01 | 0.03 | 0.01 |
| Vanadium, as $V_2O_5$ | <0.01 | <0.01 | <0.01 |
| Total | 83.43 | 84.66 | 83.73 |
| Fluoride by difference | 16.57 | 15.34 | 16.27 |

Various forms of reaction vessels may be utilized in the present invention. Appropriate reactor designs include such approaches as a multi-stage fluidized bed, a multi-stage Hirschoff furnace, or a moving packed bed reactor. Examples of packed reactors include vertical furnaces similar to a shaft kiln, or furnaces inclined somewhat from the horizontal in which solid feed material would fill the entire furnace cross section. In addition, it is possible that the reaction could be carried out in a closed refractory-lined furnace operating at temperatures above the melting point of the sulfate materials formed by the reaction. In such cases, solid waste cathode material would be added to a molten sulfate bath and caused to react through the introduction of oxygen or air, sulfur dioxide, and steam to the molten bath via refractory tubes extending into the molten bath. HF enriched exit gases would be withdrawn from the top of such a furnace. Periodically, part of the molten bath would be tapped from the furnace to provide space for the additional sulfate materials produced through the described reactions.

The spent carbonaceous materials are preferably reacted in a fluidized bed reactor. For such a reactor, the materials are first formed into an easily fluidizable form, and then subjected to fluidization and reaction. Preparation may include crushing to an appropriate size, such as by conventional crushing apparatus. It has been found that for operation of dense fluidized beds, particles should be not less than about 1 mm in size, and preferrably in the range of from about 1.3 to 5 mm. Comminuting operations generally result in the generation of fines, e.g. particles having a size below about 1 mm. Accordingly, the waste materials are subjected to a comminuting step, and then the comminuted material is subjected to a classification step to provide a cross section having oversize particles, particles in the preferred range, and fines having a smaller size. Particles having sizes above the desired range are recycled to the comminuting or crushing step, while the fines may be subjected to a shaping step if so desired. Fluidization is accomplished by provision of sufficient fluidizing gas, i.e. air, to provide the required fluidity.

The following process reactions are believed to take place:

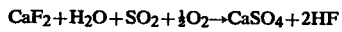

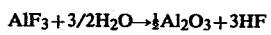

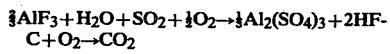

Thus, the solid products of the reaction mode comprise calcium sulfate, sodium sulfate, and alumina (in as much as aluminum sulfate decomposes at 770° C.). Minor amounts of $Fe_2(SO_4)_3$, $SiO_2$, and sulfates and/or oxides of other metals present in the waste material may also be formed. The principal gaseous product of the reaction are $CO_2$, HF, and unreacted feed gas materials.

The sulfur dioxide utilized in the reaction of the present invention may be produced externally to the furnace reactor, or produced in the reactor, in situ, by the reaction of sulfur and oxygen at elevated temperatures. If externally produced, the sulfur dioxide gas is added with the air and water fed to the furnace. A particular external source of sulfur dioxide which may be practicable is the primary exhaust gas exiting the dry scrubbers utilized for purification of the exit gases from the reactor. If the $SO_2$ and $SO_3$ levels in this dry scrubber exhaust stream are sufficiently high for ensuring complete reaction with the spent cathode material at economical furnace sizes, such gases would be fed with air and water as previously described. Although thermodynamic calculations indicate the $SO_2$ would be virtually consumed on a stoichiometric basis, if excess $SO_2$ should be necessary or desirable, it would be possible to recycle a portion of the exit gas through the reactor furnace.

It is also to be noted that other sources of $SO_2$ may be utilized in the present invention. For example, such sources of $SO_2$ as sulfuric acid, ferric sulfate, ammonium sulfate, sulfur trioxide, hydrogen sulfide, and other suitable sulfates or sulfides, as well as sulfur per se, may be utilized. However, sulfur dioxide in the presence of water, and air, has been found to be the most advantageous sulfating material.

It has been found that the reaction may be conducted at temperatures within the range of from about 600° C. to about 1200° C., with reaction efficiency improving at higher temperatures. Since the decomposition temperature of $Al_2(SO_4)_3$ is 770° C., it is preferable to operate above this temperature to maximize $Al_2O_3$ formation and minimize ash formation. Similarly, since $Na_2SO_4$ melts at 884° C., it is preferred to operate below this temperature to avoid problems of liquid $Na_2SO_4$ clogging equipment, inhibiting heat exchange, or interferring with gas flow in a fluidized bed reactor. Thus, a preferred temperature range is from about 770° C. to about 884° C., with the most preferred range being from about 850° C. to about 880° C.

It has been found that air flow rates can play a very important part in moderating reaction temperature. In actual operations, it is quite likely that the composition of the cathode waste material will vary quite markedly on a sample-by-sample basis. Thus the capability for variable air flow rates will be important for maintaining proper reactor temperature. This can be accomplished through a controlled system wherein the reactor temperature is continuously monitored and compared to a set point or set temperature range. If at any time the temperature were above the desired range, the air flow rate would be increased to provide cooling. Similarly if the temperature were below the desired range, the air flow rate would be reduced to provide heating.

In most reaction vessels, it is desirable to utilize the stoichiometric amount of $SO_2$ required for reaction. Similarly, the amount of water vapor added is also equivalent to the stoichiometric requirements for reaction with the fluorides. In as much as air is assumed as the source of oxygen, the amount of nitrogen added is equivalent to the normal ratio of nitrogen to oxygen in air. In actual operations, it may be desirable to operate the reactor with excess quantities of air. In such cases, the excess amounts of oxygen and all nitrogen would pass directly through the reactor undergoing no chemical reactions.

However, since it has been found that temperature control of the reaction may be effected by flow rate of reactant gases, it may be found advantageous under certain conditions to utilize minimal amounts of reactant gases, rather than providing large excess. For example, it may be appropriate, under certain operating conditions, to substitute oxygen for air in the inlet gases, so as to reduce the volume of gaseous material while still maintaining the necessary oxygen balance. Similarly, it may under certain conditions, be desirable to provide larger excess amounts of such reactants as sulfur dioxide. For example, geometric considerations, and/or flow/packing densities of a fluidized bed reactor may require extremely high stoichiometric excesses of reactant gas, so as to insure complete reaction of all of the fluoride values in the product feed. Of course, a far more efficient usage of the sulfur dioxide gas may be insured through the use of a properly designed reactor, and control of all operating parameters.

Regardless of the particular furnace reactor design which is chosen, the HF enriched gas exiting the reactor is fed to a second reactor to be reacted with various feed materials for the production of fluorine-containing chemicals. The potential recovery processes include the following.

Aluminum trifluoride may be produced through the reaction of the HF enriched gas with aluminum trihydrate in a fluidized bed reactor. This process is analogous to the standard industrial method for producing $AlF_3$. Alternatively, a mixed cryolite/aluminum trifluoride reduction cell bath material may be made by feeding the HF enriched gas to a dry scrubber, capturing the dried HF by chemisorption on the surface of high surface area metallurigical grade alumina, and feeding the fluoride-containing alumina to aluminum reduction cells. The excess bath produced through such additions may be periodically tapped from the reduction cells and stored for subsequent sale or use.

Cryolite may be produced following the standard industrial process of introducing the HF enriched gas stream to a caustic sodium aluminate solution.

Various fluorocarbon materials may be produced through the direct reaction of the HF enriched stream with carbon or various organic feed stock materials such as methane, ethane, or other more complex hydrocarbon materials. In a similar sense, chloro-fluorocarbon materials may be produced through the joint reaction of the HF-containing gas, HCl, and organic feed stock. In the production of fluorinated hydrocarbons, it is critical that the furnace reactor for the treatment of the waste cathode material be operated at air flow rates equivalent to the stoichiometric requirement for oxygen. Any excess oxygen would carry through with the HF enriched exit gas, leading to oxidation losses of organic feed stocks in a fluorocarbon producing reactor.

The HF gas, and the other gaseous products of the reaction, such as $CO_2$, are discharged from the reactor medium at a highly elevated temperature. Accordingly, such gases must be cooled. Cooling may be accomplished in any apparatus suitably capable of removing substantial heat from the vapors. The type of cooling equipment and/or cooling medium utilized also influence the nature of the recovered fluoridic material. For example, when the hot vapor is contacted with a cooling water spray, an aqueous HF solution is recovered. When cooling is accomplished by indirect heat exchange utilizing suitable exchange media, the HF content of the gas remains undiluted by the cooling agent and is recovered at a higher concentration.

It is particularly to be noted that the temperature of the process of the present invention is considerably lower than temperatures employed in prior art pyrohydrolysis processes. Due to the presence of the sulfur dioxide in the reaction, resulting in the formation of sulfates, a very large negative (favorable) free energy change occurs. On the other hand, under normal pyrohydrolysis conditions, a large positive (unfavorable) free energy change is encountered. On the basis of calculated free energies for the various species involved in the reactions occurring, either in the presence of sulfur dioxide or in the absence thereof, it is found that the free energy of reaction, in the presence of sulfur dioxide, would be favorable over a wide range of temperature. As a result, the choice of an optimal operating temperature hinges primarily on reaction kinetics rather than equilibrium conditions. It has also been found, experimentally, that the sulfur dioxide reaction occurs readily at moderate temperatures, whereas 20% or less conversion of sodium fluoride results under normal pyrohydrolysis without the use of $SO_2$ even at temperatures of 1100° C. Ideally, the maximum temperature within the reactor vessel would be lower than the melting point of the lowest melting temperature constituent of the ash residue, e.g. $Na_2SO_4$, which melts at 884° C. Under such conditions, there is no formation of a molten slag to enter through, nor are diffusion processes required for gaseous reaction with fluoride constituents. However, optimization of temperatures should be based upon reaction rates which increase at somewhat higher temperatures, in accordance with the specific composition of the cathode waste material being treated.

EXAMPLE 1

To confirm the possibility of reacting pure sodium fluoride, a major ingredient of cathode waste materials, with a gaseous mixture of $SO_2$, $O_2$ and $H_2O$, an experimental reaction was conducted at 860° C. Sulfur dioxide was present in this reaction at about 380 times the stoichiometric amount of limiting reagent. The conversion of sodium fluoride to sodium sulfate was found to be approximately 97% complete after one hour. Since sodium fluoride is the least reactive component of the cathode waste material, thermodynamically, it was concluded that the $SO_2$ treatment of cathode waste materials containing sodium fluoride, calcium fluoride, and aluminum fluoride was thermodynamically feasible.

EXAMPLE 2

A bench scale reaction apparatus for the removal of fluoride from cathode waste was constructed for experimentation. This apparatus comprised sources of air, $SO_2$, and steam, joined to a preheating tube for initial temperature elevation, joined to a furnace for superheating, followed by a high temperature furnace for reaction of the sample. Upon exit from the high temperature furnace, the gaseous product was passed through a condensor, with the condensate collected, followed by an absorption flask and subsequent condensors for cooling of remaining gases. In this apparatus, the current of air, steam, and $SO_2$, was superheated and passed over the cathode waste sample, which was itself heated to temperatures in the desired range. Under these conditions, carbon constituents of the waste sample were oxidized while the steam and SO₂ reacted with the fluoride compounds and released hydrogen fluoride. Following combustion and reaction, the hot gases were cooled, condensed, and passed through aqueous solutions to absorb entrained fluorides, and finally stored in large bottles containing saturated salt solutions for volume measurement. The fluoride content of the condensate was determined using a fluoride ion activity electrode. The gas flow through the apparatus was controlled by flow meters located prior to the steam generator. The steam generator was adjusted to yield 0.1 to 2.0 ml of condensate per minute. The mixture of gases was preheated prior to entering the alumina reaction tube containing the sample of cathode waste. The reaction tube was 50 inches long by 1 inch in diameter, and was heated by two electric furnaces; the first to superheat the mixture of gases, and the second to control the temperature of the sample of cathode waste, retained in an alumina boat.

One gram of reagent grade NaF (0.0246 moles) was placed in the alumina boat in the tube furnace, and 2.33 moles of O₂, 10.8 moles of SO₂, and 16.7 moles of H₂O were passed over it during 1 hour at temperatures between 850° and 870° C. The weight of the material in the boat was found to be 1.71 g after the reaction time, corresponding to 97% conversion, assuming all of the product was Na₂SO₄. Moreover, the material in the boat was found to contain 61.8% SO₄, and 2.5% NaF by weight from direct chemical analysis. This corresponds to 97% conversion of NaF to sulfate compounds.

EXAMPLE 3

Samples of typical cathode waste, taken from the stockpile of an operating aluminum plant, were reacted with SO₂, O₂, and H₂O, at temperatures of 850°, 925°, and 1,000° C. The reactions were found to be 93.6, 97.7 and 98.8% complete, respectively, after 1 hour of reaction with about 380 times the stoichiometric amount of SO₂.

The cathode waste was analyzed and found to contain 8.72% F (19.3% NaF) and 0.56% SO₃ as received. Approximately 2.8 g of cathode waste was ground and placed in the alumina reaction both in the tube furnace and 2.33 moles of O₂, 10.8 moles of SO₂ and 5.56 moles of H₂O were passed over it during 1 hour. Results are shown in Table 2.

TABLE 2

| Sample | Reaction Temp., °C. | Total initial wt. (g) | g NaF initial | Total final wt. (g) | g NaF final | % NaF reacted | % SO₃ after reaction (final) |
|---|---|---|---|---|---|---|---|
| 1 | 850 | 2.8025 | 0.5409 | 1.2893 | 0.03481 | 93.6 | 23.48 |
| 2 | 925 | 2.8157 | 0.5434 | 1.3509 | 0.01256 | 97.7 | 35.46 |
| 3 | 1000 | 2.8041 | 0.5412 | 1.4971 | 0.00629 | 98.8 | 36.65 |

For purposes of the experiment, all of the fluoride in the cathode waste was assumed to be in the NaF form, and the "percent reacted" was calculated by subtracting the grams of NaF after reaction from the grams before reaction and dividing by the grams of NaF before the reaction. However, in view of the very high reaction completion obtained, the experiment clearly illustrates the feasibility of the invention.

EXAMPLE 4

A Hirschoff furnace, a multi-stage reactor with gas/solids flow, having a number of rabbles at each level of the furnace rotating about the central axis of the furnace for directing the inward/outward flow of solids from level to level, is utilized to carry out the process for recovering fluorides from waste cathode materials. Gas velocities and the mechanics of gas flow from level to level are controlled such that the solids at each level are in a semi-fluidized state. Crushed cathode waste, mixed with sulfur, is introduced at the top of the furnace while a gas mixture composed of air and steam is introduced at the bottom. The ash residue resulting after the combustion of carbon and the sulfation of the fluoride components of the waste leaves through the bottom of the furnace. The gas stream, enriched with HF resulting from the sulfation reaction exits the top of the furnace. The exit gas stream may then be treated as previously discussed. At the various levels of the furnace, the following reactions occur. In the lowest levels of the furnace, the introduction of gases at ambient temperatures causes simultaneous cooling of the ash residue with heating of the gases. As the gases become heated there is combustion of the waste carbon material, leading to the formation of carbon dioxide and carbon monoxide. In the middle level of the furnace, sulfation of the fluoride constituents in the waste cathode materials occurs through the combined reaction of sulfur, mixed with the cathode waste solid feed material, oxygen, steam, and fluoride components. Principal reactions include:

$$2\,NaF + H_2O + S + 3/2\,O_2 \rightarrow Na_2SO_4 + 2HF$$

$$CaF_2 + H_2O + S + 3/2\,O_2 \rightarrow CaSO_4 + HF$$

$$2/3\,AlF_3 + H_2O + S + 3/2\,O_2 \rightarrow \tfrac{1}{3}Al_2(SO_4)_3 + 2HF$$
$$Al_2(SO_4)_3 \rightarrow Al_2O_3 + 3SO_3$$

In the top level of the furnace, the hot gases resulting from the combustion and sulfation reactions contact the solids fed to the top of the furnace at ambient temperature, resulting in the simultaneous heating of the solids and cooling of the gas stream before the gases exit from the top of the furnace.

It will be recognized by those skilled in the art that various equivalences and alternatives are to be considered within the scope of the present invention. The examples herein are merely for exemplary purposes, and are not meant to define the scope of the invention, which is set forth by the following claims.

We claim:

1. A process for the decomposition of carbon cathode waste material containing cryolite, aluminum fluoride, calcium fluoride, and sodium fluoride which comprises heating the waste material in the presence of water, oxygen, and sulfur dioxide to a temperature at which hydrogen fluoride is generated.

2. A process as set forth in claim 1, wherein said temperature is within the range of from about 770° C. to about 884° C.

3. A process as set forth in claim 1, wherein said decomposition takes place in a reactor selected from the group consisting of fluidized bed reactors, packed bed reactors, and closed furnace reactors.

4. A process as set forth in claim 1, wherein said sulfur dioxide is formed in situ.

5. A process as set forth in claims 2, 3, or 4, wherein said hydrogen fluoride is reacted with aluminum trihydrate to form aluminum trifluoride.

6. A process as set forth in claims 2, 3, or 4, wherein said hydrogen fluoride is reacted with sodium aluminate to form cryolite.

7. A process as set forth in claims 2, 3, or 4, wherein said hydrogen fluoride is utilized for the production of a fluorinated hydrocarbon.

8. A process as set forth in claims 3 or 4, wherein said temperature is within the range of from about 770° C. to about 884° C.

9. A process as set forth in claims 3 or 4, wherein said temperature is within the range of from about 850° C. to about 880° C.

10. A process as set forth in claims 2, 3, or 4 wherein said decomposition is conducted in a fluidized bed reactor.

11. A process as set forth in claims 2, 3, or 4, wherein said decomposition is conducted in a multiple-stage fluidized bed reactor.

12. A process as set forth in claims 2, 3, or 4 wherein said waste materials are particles ranging in size from about 1 mm to about 5 mm.

13. A process as set forth in claims 3 or 4 wherein said heating is within the temperature range of from about 600° C. to about 1200° C.

14. A process as set forth in claims 2, 3, or 4, wherein said sulfur dioxide is produced by the addition of sulfur to the heated carbonaceous materials.

* * * * *